United States Patent
Kawabe et al.

(10) Patent No.: US 10,562,013 B2
(45) Date of Patent: Feb. 18, 2020

(54) OXIDATION CATALYST FOR DIESEL ENGINES

(71) Applicants: YANMAR CO., LTD., Osaka-shi, Osaka (JP); Johnson Matthey Public Limited Company, London (GB)

(72) Inventors: Ken Kawabe, Osaka (JP); Shohei Hoshino, Osaka (JP); Masahito Shibata, Sakura (JP); Yoshihito Hashimoto, Sakura (JP)

(73) Assignees: YANMAR CO., LTD., Osaka (JP); JOHNSON MATTHEY PUBLIC LIMITED COMPANY, London (GB)

( * ) Notice: Subject to any disclaimer, the term of this patent is extended or adjusted under 35 U.S.C. 154(b) by 0 days.

(21) Appl. No.: 15/505,436

(22) PCT Filed: Aug. 7, 2015

(86) PCT No.: PCT/JP2015/072470
§ 371 (c)(1),
(2) Date: Feb. 21, 2017

(87) PCT Pub. No.: WO2016/027698
PCT Pub. Date: Feb. 25, 2016

(65) Prior Publication Data
US 2017/0291162 A1    Oct. 12, 2017

(30) Foreign Application Priority Data
Aug. 19, 2014 (JP) .................. 2014-166914

(51) Int. Cl.
*B01D 53/94* (2006.01)
*B01J 23/42* (2006.01)
(Continued)

(52) U.S. Cl.
CPC ............ *B01J 23/44* (2013.01); *B01D 53/944* (2013.01); *B01J 23/42* (2013.01); *B01J 35/0006* (2013.01);
(Continued)

(58) Field of Classification Search
None
See application file for complete search history.

(56) References Cited

U.S. PATENT DOCUMENTS 7,727,498 B2    6/2010    Hodgson et al.
8,066,951 B2    11/2011   Hodgson et al.
(Continued)

FOREIGN PATENT DOCUMENTS

| CN | 102711960 A | 10/2012 |
| CN | 103157516 A | 6/2013 |

(Continued)

OTHER PUBLICATIONS

International Search Report corresponding to Application No, PCT/JP2015/072470; dated Oct. 20, 2015, with English translation.
(Continued)

*Primary Examiner* — Colin W. Slifka
(74) *Attorney, Agent, or Firm* — Norton Rose Fulbright US LLP

(57) ABSTRACT

This oxidation catalyst for diesel engines is divided into an upstream-side catalyst layer and a downstream-side inner catalyst layer in the flow direction of the exhaust gas, and a downstream-side outer catalyst layer is additionally formed so as to cover the surface of the downstream-side inner catalyst layer. The upstream-side catalyst layer and the downstream-side inner catalyst layer contain Pd, and the downstream-side outer catalyst layer contains Pt. The amounts of Pt and Pd contained in the upstream-side catalyst layer and the amounts of Pt and Pd contained in the (Continued)

downstream-side inner catalyst layer are constantly set to certain values, while the amount of Pt contained in the downstream-side outer catalyst layer is set to a value which enables the oxidation efficiency to be at a predetermined value or higher.

17 Claims, 7 Drawing Sheets

(51) Int. Cl.
    *B01J 23/44* (2006.01)
    *B01J 35/00* (2006.01)
    *B01J 35/04* (2006.01)
    *F01N 3/035* (2006.01)
    *F01N 3/10* (2006.01)
    *F01N 3/28* (2006.01)

(52) U.S. Cl.
    CPC ........... *B01J 35/0073* (2013.01); *B01J 35/04* (2013.01); *F01N 3/035* (2013.01); *F01N 3/103* (2013.01); *F01N 3/28* (2013.01); *B01D 2255/1021* (2013.01); *B01D 2255/1023* (2013.01); *B01D 2255/9025* (2013.01); *B01D 2255/915* (2013.01)

(56) References Cited

U.S. PATENT DOCUMENTS

| | | | |
|---|---|---|---|
| 8,066,952 | B2 | 11/2011 | Hodgson et al. |
| 2003/0072694 | A1 | 4/2003 | Hodgson et al. |
| 2005/0178110 | A1* | 8/2005 | Mital .................... F01N 3/0842 60/286 |
| 2010/0186380 | A1 | 7/2010 | Hodgson et al. |
| 2010/0189616 | A1 | 7/2010 | Hodgson et al. |
| 2013/0142714 | A1* | 6/2013 | Sung ........................ B01J 23/62 423/213.5 |
| 2015/0033715 | A1* | 2/2015 | Markatou .......... B01D 53/9472 60/299 |

FOREIGN PATENT DOCUMENTS

| | | | |
|---|---|---|---|
| CN | 103338863 | A | 10/2013 |
| EP | 1057519 | A1 | 12/2000 |
| EP | 3034166 | A1 | 6/2016 |
| JP | 2001205051 | A | 7/2001 |
| JP | 2001259423 | A | 9/2001 |
| JP | 2003200049 | A | 7/2003 |
| JP | 2008114227 | A | 5/2008 |
| JP | 2008264636 | A | 11/2008 |
| JP | 2009101252 | A | 5/2009 |
| JP | 2010179204 | A | 8/2010 |
| JP | 2012-152702 | A | 8/2012 |
| JP | 2012217938 | A | 11/2012 |
| JP | 2013536756 | A | 9/2013 |
| KR | 10-2016-0040221 | A | 4/2016 |
| WO | 0180978 | A1 | 11/2001 |
| WO | 2011061321 | A1 | 5/2011 |
| WO | 2012029050 | A1 | 3/2012 |
| WO | 2012101505 | A1 | 8/2012 |

OTHER PUBLICATIONS

Extended European Search Report corresponding to Application No. 15833235.3-1004/3184169 PCT/JP2015072470; dated Mar. 8, 2018.
Korean Office Action dated Jun. 8, 2018 issued in corresponding KR Application 10-2017-7006146 cites the patent documents above.
Chinese Office Action dated Aug. 2, 2018 issued in corresponding CN Application 201580044059.3 cites the patent documents above.
Japanese Office Action dated Oct. 2, 2018 issued in corresponding JP Application 2014-166914 cites the patent documents above.

* cited by examiner

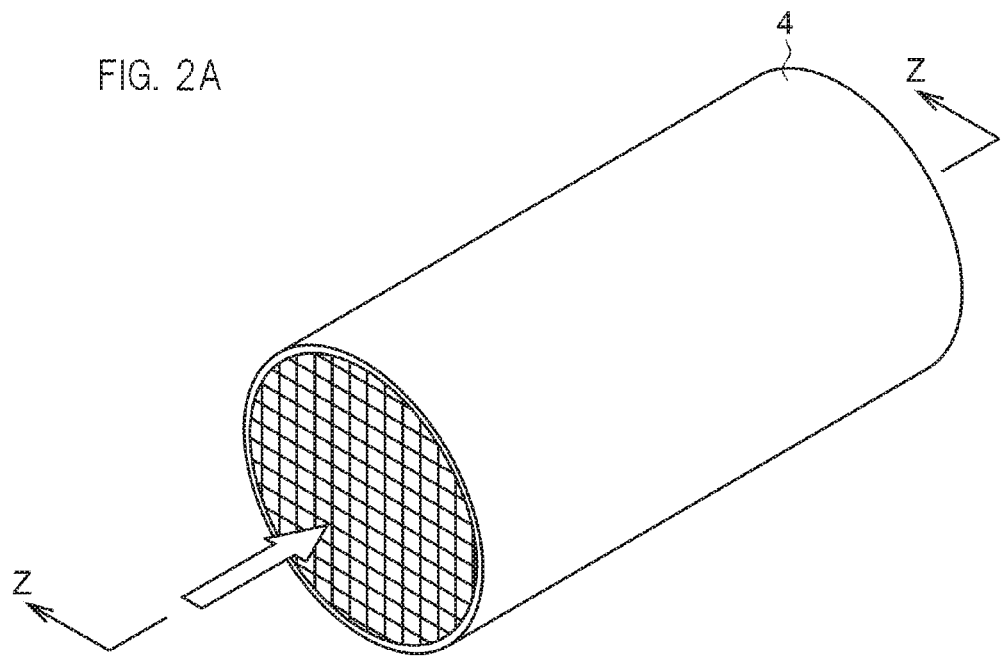
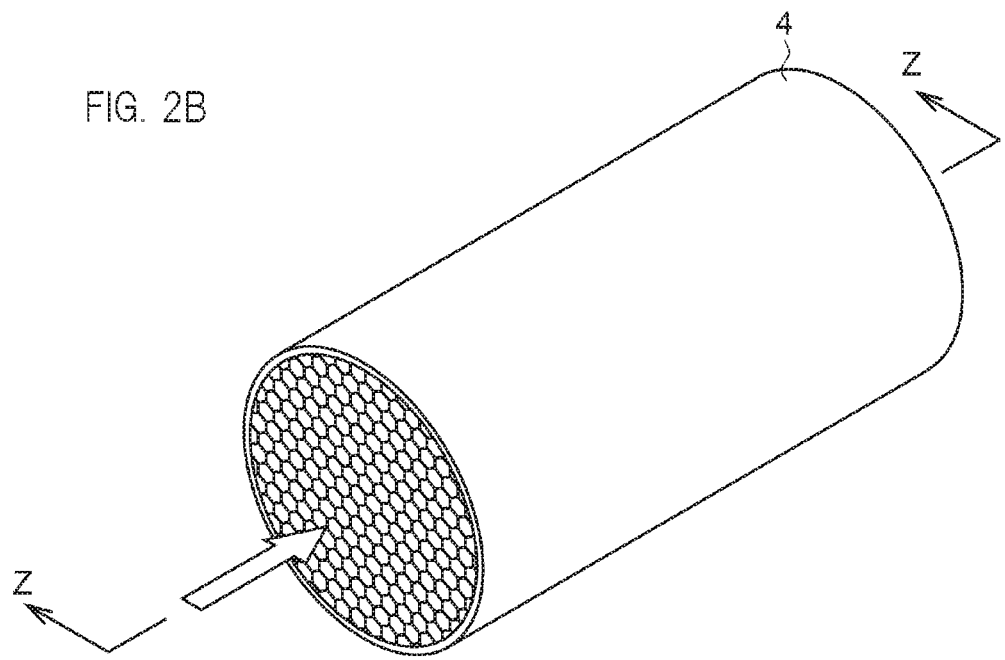

central temperature of oxidation catalyst (degC)

precious metal amount at upstream side of oxidation catalyst (g/L)

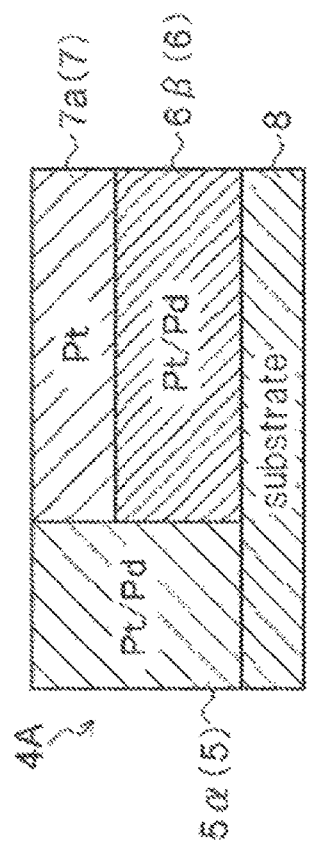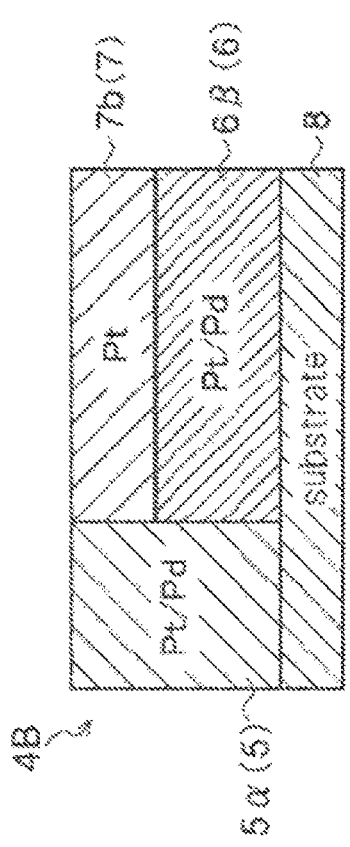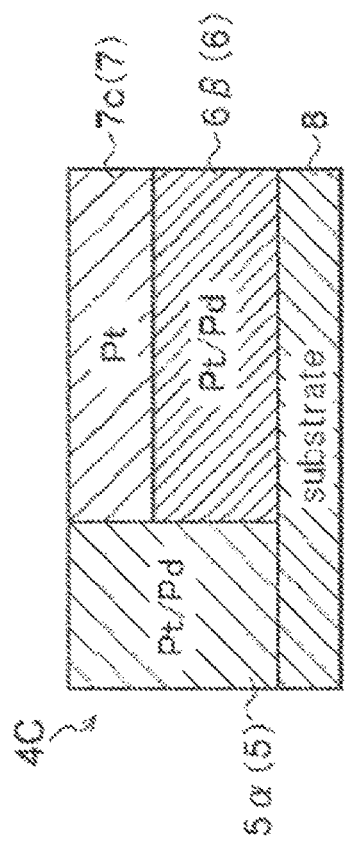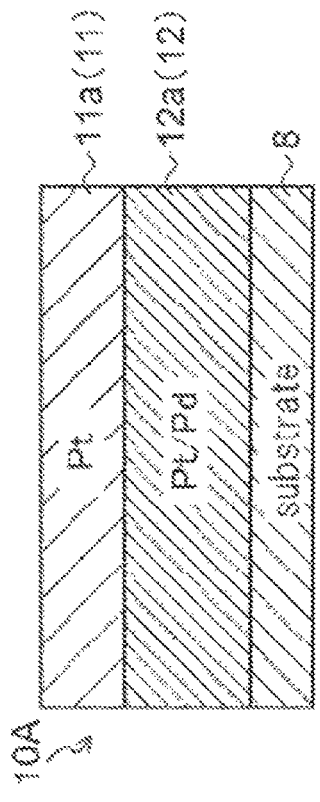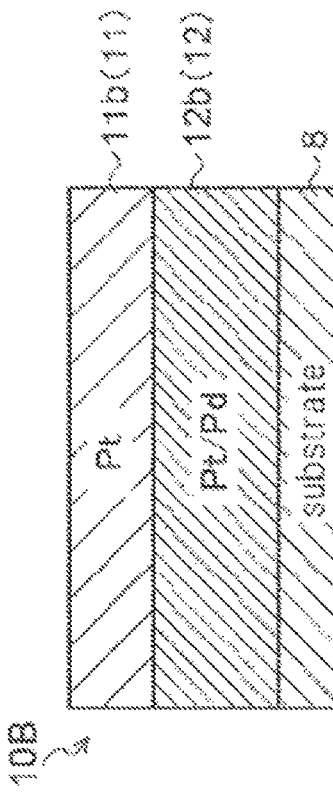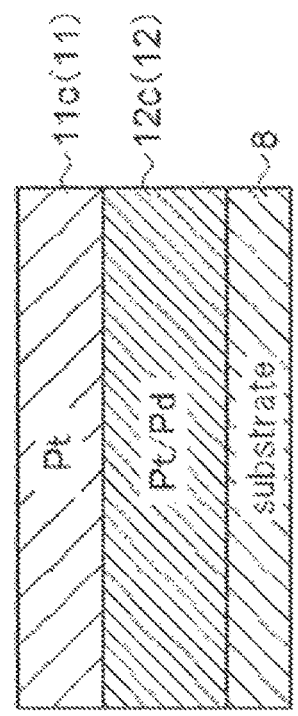
FIG. 9A - PRIOR ART
FIG. 9B

OXIDATION CATALYST FOR DIESEL ENGINES

This is the U.S. national stage of application No PCT/JP2015/072470, filed on Aug. 7, 2015. Priority under 35 U.S.C. § 119(a) and 35 U.S.C. § 365(b) is claimed from Japanese Application No. 2014-166914, filed Aug. 19, 2014, the disclosure of which is also incorporated herein by reference.

TECHNICAL FIELD

The present invention relates to an oxidation catalyst for a diesel engine.

BACKGROUND ART

Conventionally, as a catalyst purifying exhaust gas from a diesel engine, an oxidation catalyst oxidizing carbon monoxide (CO), hydrocarbon (HC), and nitrogen monoxide (NO) in the exhaust gas is used. The oxidation catalyst is made by applying a carrier including porous oxide such as alumina to a member of ceramic or metal so as to form a catalyst layer. The catalyst layer including precious metal such as platinum (Pt) and palladium (Pd) is known.

In the oxidation catalyst, for exhibiting characteristics of platinum (Pt), palladium (Pd) and the like so as to improve performance of the oxidation catalyst, in consideration of temperature at each part of the catalyst and components of the exhaust gas, the oxidation catalyst in which different materials are arranged in upstream and downstream sides of a substrate is developed. For example, an art described in the Patent Literature 1 is so.

However, in the oxidation catalyst described in the Patent Literature 1, the carrier in which amounts of Pt and Pd are adjusted corresponding to characteristics of the exhaust gas must be applied to a predetermined position. Namely, blending of a plurality of catalysts arranged in each part of the substrate must be performed for the diesel engine connected to the oxidation catalyst, whereby it is disadvantageous because production cost is increased.

PRIOR ART REFERENCE

Patent Literature

Patent Literature 1: the Japanese Patent Laid Open Gazette 2009-101252

DISCLOSURE OF INVENTION

Problems to be Solved by the Invention

The present invention is provided for the above problem, and the purpose of the present invention is to provide an oxidation catalyst for a diesel engine which can reduce production cost while maintaining performance of the oxidation catalyst.

Means for Solving the Problems

The problems to be solved by the present invention have been described above, and subsequently, the means of solving the problems will be described below.

According to the present invention, in an oxidation catalyst for a diesel engine whose substrate has three catalyst layers including at least one of Pt and Pd, the oxidation catalyst is composed of an upstream-side catalyst layer, a downstream-side inner catalyst layer and a downstream-side outer catalyst layer concerning a flow direction of exhaust gas. The upstream-side catalyst layer and the downstream-side inner catalyst layer include Pt and Pd and the downstream-side outer catalyst layer includes Pt, amounts of Pt and Pd included in the upstream-side catalyst layer and amounts of Pt and Pd included in the downstream-side inner catalyst layer are fixed, and an amount of Pt included in the downstream-side outer catalyst layer is set so as to make oxidation efficiency not less than a predetermined value.

According to the present invention, in an oxidation catalyst for a diesel engine having three catalyst layers including at least one of Pt and Pd, the oxidation catalyst is composed of an upstream-side catalyst layer, a downstream-side inner catalyst layer and a downstream-side outer catalyst layer concerning a flow direction of exhaust gas. The upstream-side catalyst layer and the downstream-side inner catalyst layer include Pt and Pd and the downstream-side outer catalyst layer includes Pt, amounts of Pt and Pd included in the upstream-side catalyst layer and amounts of Pt and Pd included in the downstream-side inner catalyst layer are fixed, and an amount of Pt included in the downstream-side outer catalyst layer is set so as to make oxidation efficiency not less than a predetermined value. A length of the downstream-side outer catalyst layer in a flow direction of exhaust gas is not less than half of a whole length of the oxidation catalyst for the diesel engine in the flow direction of the exhaust gas.

According to the present invention, a through hole having a hexagonal section against the flow direction of the exhaust gas is formed in the substrate.

According to the present invention, the substrate is a partial type soot filter.

Effect of the Invention

The present invention configured as the above brings the following effects.

According to the present invention, HC and CO are removed by oxidation promotion effect of Pt and Pd included in the upstream-side catalyst layer, whereby the oxidation promotion effect of Pt is not lowered even when the amount of Pt included in the downstream-side inner catalyst layer is reduced. It is not necessary to produce characteristics of the upstream-side catalyst layer and the downstream-side inner catalyst layer corresponding to the characteristics of the exhaust gas. Accordingly, production cost can be reduced while maintaining the performance of the oxidation catalyst.

According to the present invention, HC and CO are removed by the oxidation promotion effect of Pt and Pd included in the upstream-side catalyst layer, and Pt is arranged intensively in the fixed range of the downstream-side outer catalyst layer so as to improve the oxidation efficiency, whereby the oxidation promotion effect of Pt is not lowered even when the amount of Pt included in the downstream-side inner catalyst layer is reduced. It is not necessary to produce the upstream-side catalyst layer and the downstream-side inner catalyst layer corresponding to the characteristics of the exhaust gas. Accordingly, production cost can be reduced while maintaining the performance of the oxidation catalyst.

According to the present invention, the catalyst can be applied uniformly to the substrate easily. Accordingly, production cost can be reduced while maintaining the performance of the oxidation catalyst.

According to the present invention, the catalyst layer is adopted to not only the substrate having the through hole but also the partial type soot filter. Accordingly, production cost can be reduced while maintaining the performance of the oxidation catalyst.

BRIEF DESCRIPTION OF DRAWINGS

FIG. 2A is a perspective view of an embodiment of an oxidation catalyst for a diesel engine according to the present invention. FIG. 2B is a perspective view of another embodiment of the oxidation catalyst for a diesel engine according to the present invention.

FIG. 9A is a schematic drawing of combination of catalysts of the conventional catalyst layer required for production of each diesel engine. FIG. 9B is a schematic drawing of combination of catalysts of the catalyst layer used in the present invention required for production of each diesel engine.

DETAILED DESCRIPTION OF THE INVENTION

Figure 1:
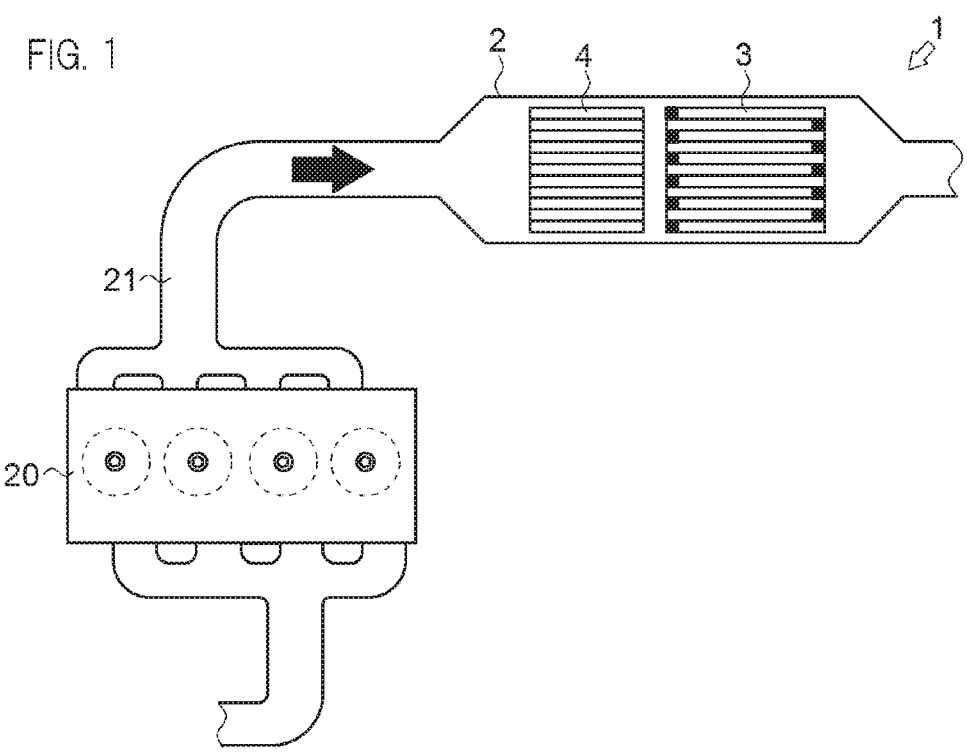
FIG. 1 is a schematic drawing of an entire configuration of an exhaust purifier.
Figure 3:
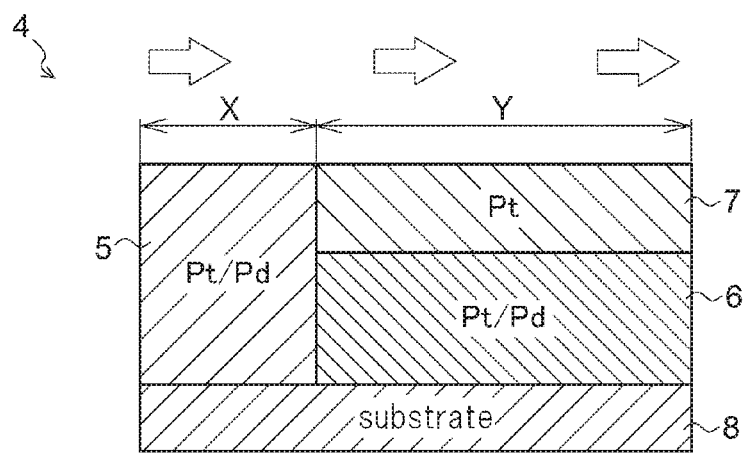
FIG. 3 is a schematic drawing of FIG. 2B, FIG. 2B and FIG. 4 viewed from arrows Z.

Referring to FIGS. 1 to 3, an exhaust purifier 1 is explained. In this embodiment, an "upstream side" means an upstream side in a flow direction of fluid, and a "downstream side" means a downstream side in the flow direction of the fluid.

As shown in FIG. 1, the exhaust purifier 1 purifies exhaust gas discharged from a diesel engine 20. The exhaust purifier 1 is provided in an exhaust pipe 21 connected to the diesel engine 20. The exhaust purifier 1 has a casing 2, a soot filter 3, an oxidation catalyst 4 and the like.

The casing 2 guides the exhaust gas to the soot filter 3 and the oxidation catalyst 4 arranged therein. The exhaust pipe 21 is connected to one of ends of the casing 2, and the other end of the casing 2 is opened to the outside via the exhaust pipe 21. Namely, the casing 2 is provided in a middle part of the exhaust pipe 21 connected to the diesel engine 20, and is configured as an exhaust passage in which the exhaust gas from the diesel engine 20 flows from the one side (upstream side) to the other side (downstream side) (see a black arrow in FIG. 1).

The soot filter 3 removes particulates (soot including carbon, highly boiling hydrocarbon component (SOF) and the like) in the exhaust gas. The soot filter 3 is arranged inside the casing 2. For example, the soot filter 3 includes a porous wall such as ceramic formed lattice-like. The soot filter 3 is configured so as to make the exhaust gas guided by the casing 2 pass through the porous wall. When the exhaust gas pass through the porous wall, the soot filter 3 collects particulates in the exhaust gas. As a result, the particulates are removed from the exhaust gas.

The oxidation catalyst 4 oxidizes carbon monoxide (hereinafter, simply referred to as "CO"), hydrocarbon (hereinafter, simply referred to as "HC"), and nitrogen monoxide (hereinafter, simply referred to as "NO") in the exhaust gas discharged from the diesel engine 20. The oxidation catalyst 4 is arranged upstream the soot filter 3. A predetermined range of a substrate 8 is coated with a catalyst carrier including catalyst metal, and dried and baked at predetermined temperature and time so as to configure the oxidation catalyst 4.

The substrate 8 of the oxidation catalyst 4 shown in FIG. 3 is an optional material generally used for an exhaust gas purification catalyst, for example, a ceramic material having heat resistance such as cordierite (2MgO.2Al2O3.5SiO2), alumina, zirconia, and silicon carbide and a metal material including metal foil of stainless steel and the like, formed to be a structure having many through holes.

The carrier including catalyst metal of the oxidation catalyst 4 is an optional metal oxide generally used as a catalyst carrier, for example, a metal oxide selected from a group including alumina (Al2O3), zirconia (ZrO2), seria (CeO2), silica (SiO2), titania (TiO2) and combination thereof.

In the exhaust purifier 1 configured as the above, the exhaust gas from the diesel engine 20 is supplied via the exhaust pipe 21 to the casing 2. The exhaust purifier 1 oxidizes CO, HC and NO included in the exhaust gas by making the supplied exhaust gas pass through the oxidation catalyst 4 (see a white arrow in FIG. 3). Furthermore, the exhaust purifier 1 collects particulates included in the supplied exhaust gas by the soot filter 3.

Next, referring FIGS. 2 to 9, the oxidation catalyst 4 of the exhaust purifier 1 is explained concretely.

The oxidation catalyst 4 shown in FIG. 2 is flow-through type. Any one of the flow-through type which is a through substrate having a lattice-like section as shown in FIG. 2A or a through substrate having a hexagonal section as shown in FIG. 2(B) may be used. A plurality of passages are configured in the through substrate. The passages may have various sectional shapes. Preferably, each of the passages of the through substrate has a hexagonal section.

Figure 4:
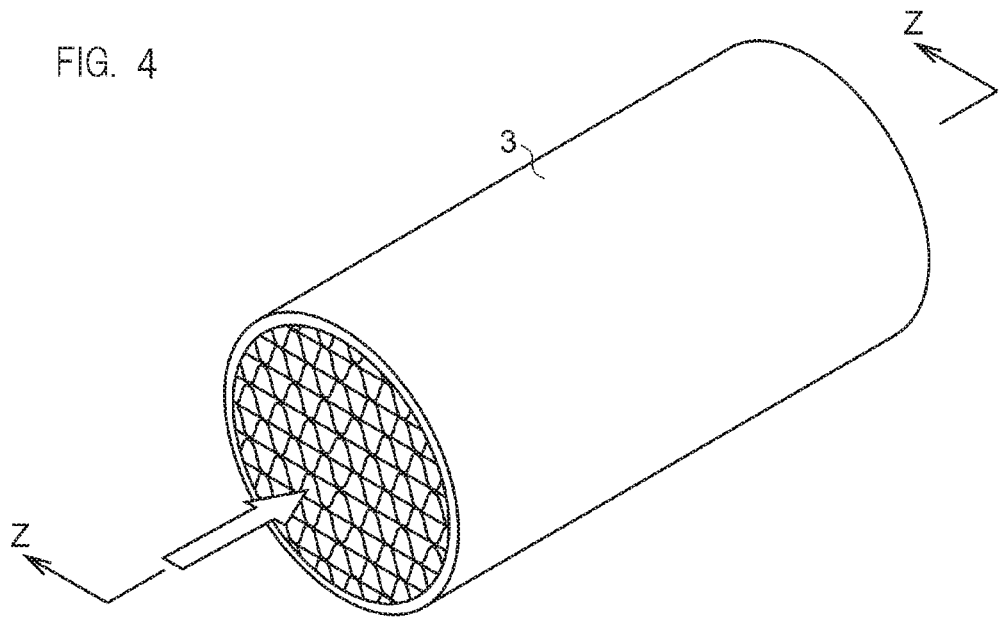
FIG. 4 is a perspective view of an embodiment of a partial type soot filter according to the present invention.

The soot filter 3 shown in FIG. 4 is partial type. The partial type soot filter 3 is known in the technical field (see WO 01/80978 or EP1057519). The typical partial type soot filter has a plurality of channels and a plurality of walls which are boundaries of the plurality of the channels. Each of the channels has at least one opening end, and preferably has two opening ends.

The partial type soot filter has an element collecting particulates. The typical collecting element is a plurality of deviations provided in the plurality of the walls. Each of the walls may have any deviation or one or more deviations. Each of the deviations acts as an obstacle concerning particle matters in the exhaust gas flowing through the substrate. Each of the deviations has a flap or a wing-like shape, and the typical deviation is directed (with a certain angle) outward from a wall surface of the deviation. Preferably, each of the deviations is connected to an opening of a wall of the carrier. Each opening in the wall can make the exhaust gas flow from one channel to an adjacent channel.

A catalyst layer of the present invention is adopted to the flow-through type oxidation catalyst 4 or the partial type soot filter 3. A group including at least one of the soot filter 3 and the oxidation catalyst 4 to which the catalyst layer of the present invention is defined as an oxidation catalyst for a diesel engine of the present invention. The catalyst layer of the present invention is formed so as to be composed of an upstream-side catalyst layer 5, a downstream-side inner catalyst layer 6 and a downstream-side outer catalyst layer 7. Below, the case in which the catalyst layer of the present invention is adopted to the oxidation catalyst 4 is explained.

The upstream-side catalyst layer 5 shown in FIG. 3 is formed at an upstream side of the exhaust gas in the substrate 8 including cordierite and the like. In the upstream-side catalyst layer 5, a carrier including alumina and the like is coated by the substrate 8 with a wash-coat method or the like. The coated upstream-side catalyst layer 5 is dried at predetermined temperature and time. Similarly, the downstream-side inner catalyst layer 6 is formed at a downstream side of the exhaust gas in the substrate 8. Furthermore, the downstream-side outer catalyst layer 7 is formed on a surface of the downstream-side inner catalyst layer 6 (upper side of the downstream-side inner catalyst layer 6). The oxidation catalyst 4 in which the upstream-side catalyst layer 5, the downstream-side inner catalyst layer 6 and the downstream-side outer catalyst layer 7 are formed at the predetermined positions of the substrate 8 is baked at predetermined temperature and time.

In this case, the oxidation catalyst 4 is configured so that lengths of the downstream-side inner catalyst layer 6 and the downstream-side outer catalyst layer 7 in the flow direction of the exhaust gas are not less than half of the whole length of the oxidation catalyst 4 in the flow direction of the exhaust gas. Concretely, when the upstream-side catalyst layer 5 and the downstream-side outer catalyst layer 7 are formed so as to be adjacent to each other, the oxidation catalyst 4 is set so that a ratio of a length of the upstream-side catalyst layer 5 and the length of the downstream-side outer catalyst layer 7 X:Y is within a range from 1:9 to 5:5. By forming the downstream-side outer catalyst layer 7 within the fixed range as the above, oxidation can be promoted efficiently.

A carrier of the upstream-side catalyst layer 5 includes Pt and Pd as catalyst metal at a predetermined ratio (For example, a ratio of 2:1 to 4:1 and 1.8 to 2.4 g/L of an amount of platinum is suitable. However, a ratio of 1:2 to 10:1 and 0.1 to 3.0 g/L of the amount of platinum is permitted). A carrier of the downstream-side inner catalyst layer 6 includes Pt and Pd as catalyst metal at a predetermined ratio (for example, 1:1). A carrier of the downstream-side outer catalyst layer 7 includes only Pt as catalyst metal at an optional ratio within a predetermined range. Namely, the oxidation catalyst 4 is configured so that only the upstream-side catalyst layer 5 and the downstream-side inner catalyst layer 6 include Pd.

An amount of Pt included in the downstream-side outer catalyst layer 7 is set optionally within the predetermined range corresponding to characteristics of the exhaust gas as mentioned above. On the other hand, amounts of Pt and Pd included in the upstream-side catalyst layer 5 and the downstream-side inner catalyst layer 6 is set predetermined amounts always regardless of the amount of Pt included in the downstream-side outer catalyst layer 7. Namely, the oxidation catalyst 4 is configured so that only the amount of Pt included in the downstream-side outer catalyst layer 7 is changed corresponding to the characteristics of the exhaust gas.

In the oxidation catalyst 4 configured as the above, when the exhaust gas reaches the upstream-side catalyst layer 5, CO included in the exhaust gas is oxidized to CO2 and HC is oxidized to H2O and CO2 by oxidation promotion effect of Pt and Pd included in the upstream-side catalyst layer 5. Namely, the upstream-side catalyst layer 5 removes CO and HC, which obstruct oxidation promotion effect of Pt of the downstream-side outer catalyst layer 7, from the exhaust gas. In the oxidation catalyst 4, when the exhaust gas from which CO and HC are removed reaches the downstream-side inner catalyst layer 6 and the downstream-side outer catalyst layer 7, NO included in the exhaust gas is oxidized to NO2 by oxidation promotion effect of Pt included in the downstream-side outer catalyst layer 7.

Figure 5:
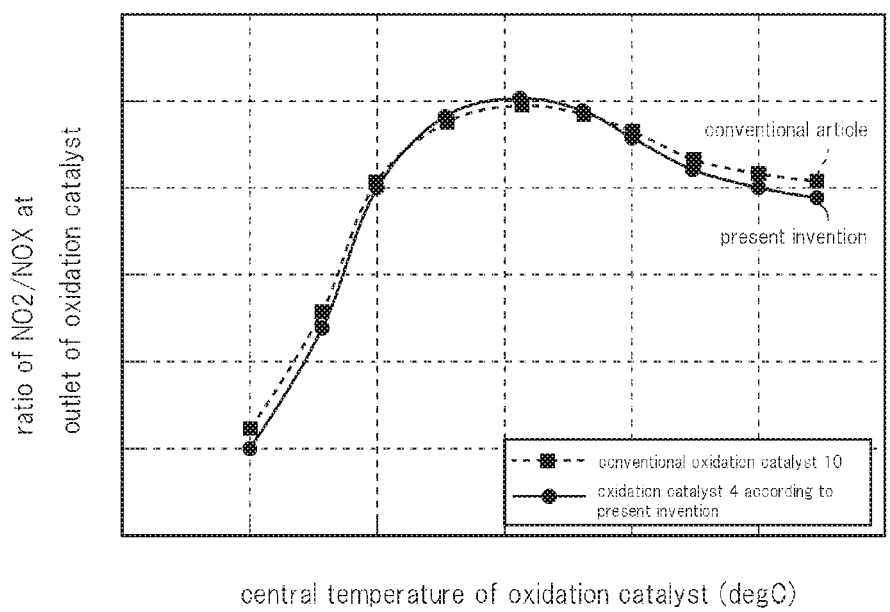
FIG. 5 is a graph of conversion efficiency of a catalyst layer of the present invention and a conventional catalyst layer.

Namely, in the oxidation catalyst 4, CO and HC are removed by the upstream-side catalyst layer 5, and Pt is contained intensively in the downstream-side outer catalyst layer 7 so as to improve conversion efficiency of NO to NO2. Accordingly, as shown in FIG. 5, the oxidation catalyst 4 according to the present invention maintains equivalent conversion efficiency to conversion efficiency of a conventional oxidation catalyst 10 with fewer amount of Pt than that of the conventional oxidation catalyst 10.

Figure 6:
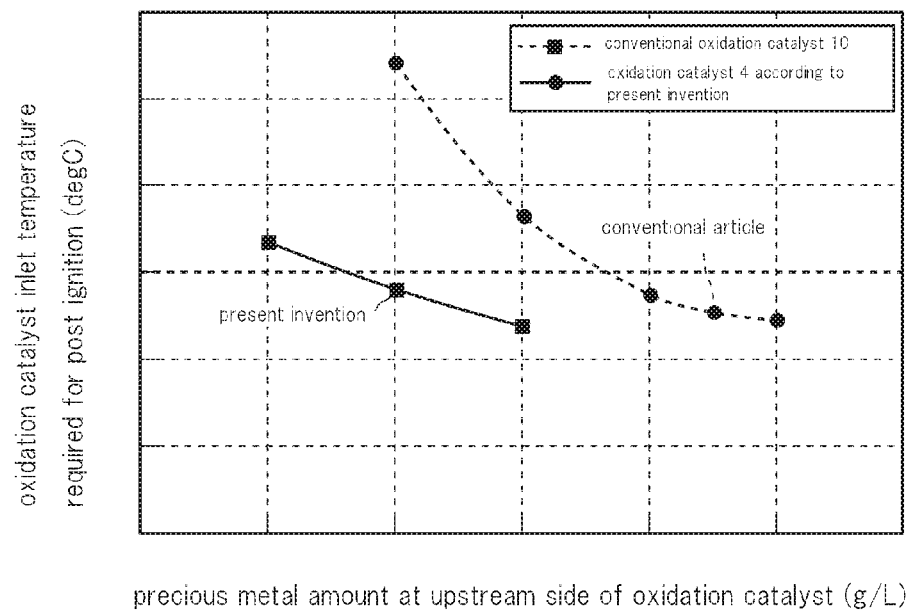
FIG. 6 is a graph of inlet temperature required for post ignition of the catalyst layer of the present invention and the conventional catalyst layer.

In the oxidation catalyst 4, the upstream-side catalyst layer 5 includes Pd so as to improve ignition performance at the time of post ignition. Namely, in the oxidation catalyst 4, an inlet temperature of the oxidation catalyst 4 required for the post ignition is lowered. Accordingly, as shown in FIG. 6, the oxidation catalyst 4 according to the present invention can perform the post ignition with lower amount of Pt than that of the conventional oxidation catalyst 10 at equivalent temperature to temperature required by the post ignition of the conventional oxidation catalyst 10.

Figure 7:
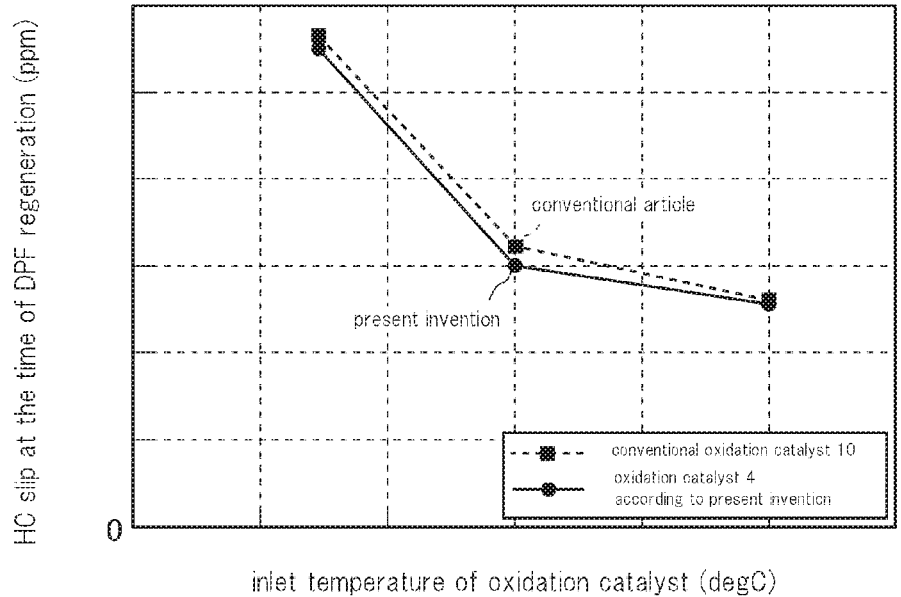
FIG. 7 is a graph of slip of HC at the time of DPF regeneration of the catalyst layer of the present invention and the conventional catalyst layer.

Furthermore, in the oxidation catalyst 4, the upstream-side catalyst layer 5 includes Pd so as to improve conversion efficiency of HC to H2O and CO2. Namely, in the oxidation catalyst 4, a slip amount of HC is lowered. Accordingly, as shown in FIG. 7, in the oxidation catalyst 4 according to the present invention, equivalent slip amount of HC to slip amount of the conventional oxidation catalyst 10 is maintained with lower amount of Pt than that of the conventional oxidation catalyst 10.

Figure 8A:
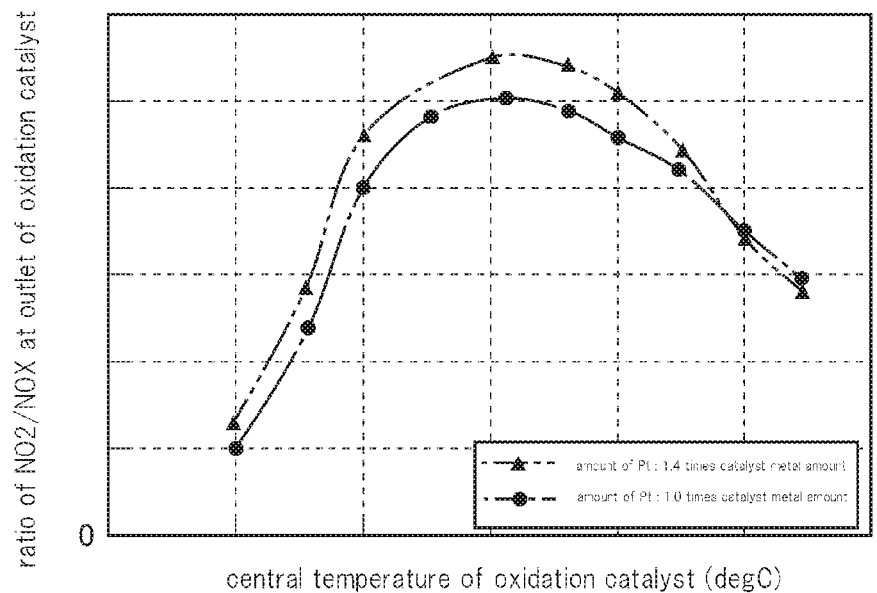
FIG. 8A is a graph of the conversion efficiency of the catalyst layer used in the present invention corresponding to amount of catalyst metal.
Figure 8B:
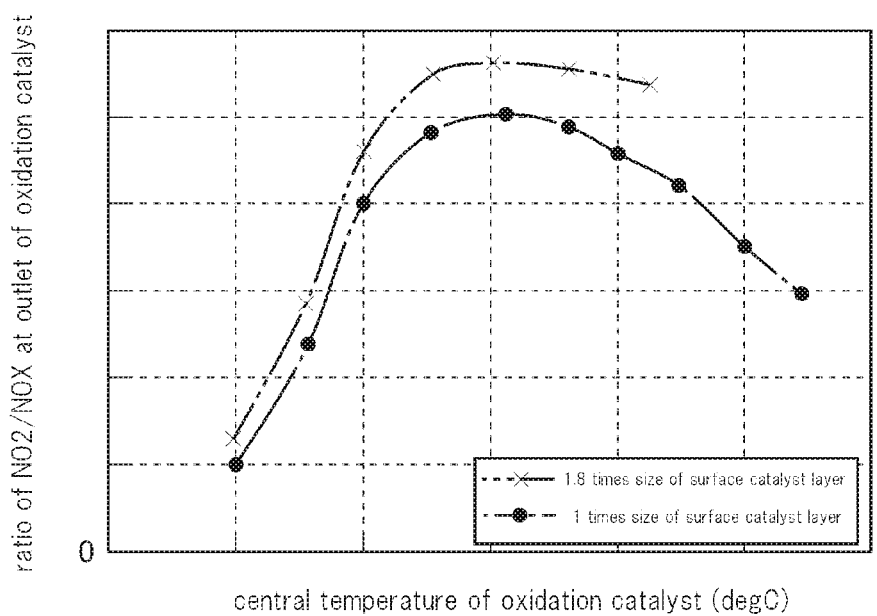
FIG. 8B is a graph of the conversion efficiency of the catalyst layer used in the present invention corresponding to size of a downstream-side outer catalyst layer.

In the oxidation catalyst 4, as shown in FIG. 8A, when the amount of Pt included in the downstream-side outer catalyst layer 7 is increased, the conversion efficiency of NO to NO2 is improved. Similarly, in the oxidation catalyst 4, as shown in FIG. 8(B), when the downstream-side outer catalyst layer 7 is enlarged, the conversion efficiency of NO to NO2 is improved. Namely, in the oxidation catalyst 4, by increasing the amount of Pt included in the downstream-side outer catalyst layer 7, the oxidation catalyst 4 can be miniaturized. Accordingly, the oxidation catalyst 4 can be arranged in a smaller space.

The substrate 8 of the oxidation catalyst 4 is shaped so as to have the hexagonal section against the flow direction of the exhaust gas, whereby the catalyst can be applied uniformly to the substrate 8 easily. Accordingly, production cost can be reduced while maintaining the performance of the oxidation catalyst 4.

Next, referring to FIG. 9A and FIG. 9B, combination of the oxidation catalyst 4 and the diesel engine is explained.

The oxidation catalyst 4 is configured so as to exhibit performance corresponding to the diesel engine by changing kind and amount of the catalyst metal included in the substrate following characteristics of the exhaust gas. As shown in FIG. 9A, in the case of the oxidation catalyst 10 including a surface side catalyst 11 and an inner side catalyst 12 and difference kinds of the catalyst metal are arranged in each of the catalyst, the kinds and amounts of the catalyst metal arranged in the surface side catalyst 11 and the inner side catalyst 12 are determined for the diesel engine connected thereto, and the oxidation catalyst 10 is produced through processes such as preparation, coating, drying and baking.

Concretely, when the oxidation catalyst 10 is produced for diesel engines A, B and C, it is necessary to prepare a surface side catalyst layer 11a and an inner side catalyst layer 12a as an oxidation catalyst 10A for the diesel engine A. It is necessary to prepare a surface side catalyst layer 11b and an inner side catalyst layer 12b with blending of the catalyst different from that of the catalyst layers of the oxidation catalyst 10A as an oxidation catalyst 10B for the diesel engine B. It is necessary to prepare a surface side catalyst layer 11c and an inner side catalyst layer 12c with blending of the catalyst different from that of the catalyst layers of the oxidation catalyst 10A and the oxidation catalyst 10B as an oxidation catalyst 10C for the diesel engine C. Accordingly, it is necessary to prepare total 6 catalyst layers.

However, amounts of CO and HC included in the exhaust gas are influenced a little by the characteristics of the diesel engine. Accordingly, the oxidation efficiency of the oxidation catalyst 4 is not lowered without changing the kinds and amounts of the catalyst metal of the upstream-side catalyst layer 5 whose target includes oxidation of CO and HC included in the exhaust gas for each diesel engine. In the oxidation catalyst 4, the upstream-side catalyst layer 5 is formed upstream the downstream-side inner catalyst layer 6, and the downstream-side outer catalyst layer 7 is formed in the surface of the downstream-side inner catalyst layer 6. Accordingly, in comparison with the upstream-side catalyst layer 5 and the downstream-side outer catalyst layer 7, the downstream-side inner catalyst layer 6 is hard to contact the exhaust gas and has low contribution rate to the performance of the oxidation catalyst 4. Namely, in the oxidation catalyst 4, the oxidation efficiency is not lowered without changing the kinds and amounts of the catalyst metal of the downstream-side inner catalyst layer 6 whose contribution rate to the performance is low.

Furthermore, the catalyst metal included in the oxidation catalyst 4 contributes to improvement of post ignition performance. Namely, the contribution rate to the post ignition performance of the upstream-side catalyst layer 5 which contacts firstly HC by post injection depends strongly on the kinds and amounts of the catalyst metal included in the upstream-side catalyst layer 5. The downstream-side inner catalyst layer 6 and the downstream-side outer catalyst layer 7 are heated by oxidation heat of HC generated in the upstream-side catalyst layer 5 so that their oxidation speed is increased. Namely, the contribution rate of the downstream-side inner catalyst layer 6 and the downstream-side outer catalyst layer 7 to the post ignition performance does not depend on the kinds and amounts of the catalyst metal included in the downstream-side inner catalyst layer 6 and the downstream-side outer catalyst layer 7. The post injection is performed at substantially the same condition regardless of the kinds of the diesel engines A, B and C. Accordingly, in the oxidation catalyst 4, the post ignition performance is not lowered without changing the kinds and amounts of the catalyst metal of the upstream-side catalyst layer 5, the downstream-side inner catalyst layer 6 and the downstream-side outer catalyst layer 7 for the diesel engines A, B and C.

On the other hand, an amount of NO included in the exhaust gas is influenced greatly by the characteristics of the diesel engine. Namely, in the oxidation catalyst 4, the oxidation efficiency is changed by changing the amount of Pt which is the catalyst metal of the downstream-side outer catalyst layer 7 whose target is oxidation of NO included in the exhaust gas. Accordingly, in the oxidation catalyst 4, the amount of Pt included in the downstream-side outer catalyst layer 7 is set optionally within a predetermined range corresponding to the characteristics of the exhaust gas. Namely, in the oxidation catalyst 4, only the amount of Pt included in the downstream-side outer catalyst layer 7 is changed corresponding to the characteristics of the diesel engine, and the upstream-side catalyst layer 5 and the downstream-side inner catalyst layer 6 are common regardless of the characteristics of the diesel engine.

Concretely, as shown in FIG. 9B, when the oxidation catalyst 4 is produced for the diesel engines A, B and C, it is necessary to prepare an upstream-side catalyst layer 5α, a downstream-side inner catalyst layer 6β and a downstream-side outer catalyst layer 7a as an oxidation catalyst 4A for the diesel engine A. It is necessary to prepare the upstream-side catalyst layer 5α and the downstream-side inner catalyst layer 6β with the same blending of the catalyst as the upstream-side catalyst layer 5α and the downstream-side inner catalyst layer 6β of the oxidation catalyst 4A and a downstream-side outer catalyst layer 7b with different blending of the catalyst from the downstream-side outer catalyst layer 7a of the oxidation catalyst 4A as an oxidation catalyst 4B for the diesel engine B. It is necessary to prepare the upstream-side catalyst layer 5α and the downstream-side inner catalyst layer 6β with the same blending of the catalyst as the upstream-side catalyst layer 5α and the downstream-side inner catalyst layer 6β of the oxidation catalyst 4A (the oxidation catalyst 4B) and a downstream-side outer catalyst layer 7c with different blending of the catalyst from the downstream-side outer catalyst layer 7a of the oxidation catalyst 4A and the downstream-side outer catalyst layer 7b of the oxidation catalyst 4B as an oxidation catalyst 4C for the diesel engine C. Accordingly, it is necessary to prepare total 5 kinds of the catalyst. Accordingly, in the oxidation catalyst 4, the upstream-side catalyst layer 5α and the downstream-side inner catalyst layer 6β are common regardless of the kinds of the diesel engines so that number of the required catalysts is reduced though number of the catalyst layers is increased from the oxidation catalyst 10.

As the above, the oxidation catalyst for the diesel engine including the three catalyst layers having at least one of Pt and Pd is composed of the upstream-side catalyst layer 5, the downstream-side inner catalyst layer 6 and the downstream-side outer catalyst layer 7 concerning the flow direction of the exhaust gas. The upstream-side catalyst layer 5 and the downstream-side inner catalyst layer 6 include Pt and Pd and the downstream-side outer catalyst layer 7 includes Pt. The amounts of Pt and Pd included in the upstream-side catalyst layer 5 and the amounts of Pt and Pd included in the downstream-side inner catalyst layer 6 are fixed, and the amount of Pt included in the downstream-side outer catalyst layer 7 is set so as to make the oxidation efficiency not less than the predetermined value.

According to the configuration, HC and CO are removed by the oxidation promotion effect of Pt and Pd included in the upstream-side catalyst layer 5, whereby the oxidation promotion effect of Pt is not lowered even when the amount of Pt included in the downstream-side inner catalyst layer 6 is reduced. It is not necessary to produce the upstream-side catalyst layer 5 and the downstream-side inner catalyst layer 6 corresponding to the characteristics of the exhaust gas of the diesel engine 20. Accordingly, production cost can be reduced while maintaining the performance of the oxidation catalyst 4.

As the above, the oxidation catalyst for the diesel engine including the three catalyst layers having at least one of Pt and Pd is composed of the upstream-side catalyst layer 5, the downstream-side inner catalyst layer 6 and the downstream-side outer catalyst layer 7 concerning the flow direction of the exhaust gas. The upstream-side catalyst layer 5 and the downstream-side inner catalyst layer 6 include Pt and Pd and the downstream-side outer catalyst layer 7 includes Pt. The amounts of Pt and Pd included in the upstream-side catalyst layer 5 and the amounts of Pt and Pd included in the downstream-side inner catalyst layer 6 are fixed, and the amount of Pt included in the downstream-side outer catalyst layer 7 is set so as to make the oxidation efficiency not less than the predetermined value. The length of the downstream-side outer catalyst layer 7 in the flow direction of the exhaust gas is not less than half of the whole length of the oxidation catalyst 4 in the flow direction of the exhaust gas.

According to the configuration, HC and CO are removed by the oxidation promotion effect of Pt and Pd included in the upstream-side catalyst layer 5, and Pt is arranged intensively in the fixed range of the downstream-side outer catalyst layer 7 so as to improve the oxidation efficiency, whereby the oxidation promotion effect of Pt is not lowered even when the amount of Pt included in the downstream-side inner catalyst layer 6 is reduced. It is not necessary to produce the upstream-side catalyst layer 5 and the downstream-side inner catalyst layer 6 corresponding to the characteristics of the exhaust gas of the diesel engine. Accordingly, production cost can be reduced while maintaining the performance of the oxidation catalyst 4.

INDUSTRIAL APPLICABILITY

The present invention can be used for an art of an oxidation catalyst for a diesel engine.

DESCRIPTION OF NOTATIONS 3 soot filter
4 oxidation catalyst
5 upstream-side catalyst layer
6 downstream-side inner catalyst layer
7 downstream-side outer catalyst layer
8 substrate

The invention claimed is:

1. An oxidation catalyst for a diesel engine, the oxidation catalyst comprising:
a substrate; and
three catalyst layers including at least one of Pt and Pd, wherein:
the oxidation catalyst is composed of an upstream-side catalyst layer, a downstream-side inner catalyst layer, and a downstream-side outer catalyst layer,
the upstream-side catalyst layer is positioned upstream of the downstream-side inner catalyst and the downstream-side outer catalyst in relation to a flow direction of exhaust gas,
the downstream-side inner catalyst layer is positioned between the substrate and the downstream-side outer catalyst layer,
the upstream-side catalyst layer and the downstream-side inner catalyst layer include Pt and Pd and the downstream-side outer catalyst layer includes Pt, amounts of Pt and Pd included in the upstream-side catalyst layer and amounts of Pt and Pd included in the downstream-side inner catalyst layer are fixed, and an amount of Pt included in the downstream-side outer catalyst layer is set so as to make oxidation efficiency not less than a predetermined value,
a ratio of a length of the upstream-side catalyst layer and a length of the downstream-side outer catalyst layer is within a range from 1:9 to 1:1 for the diesel engine in the flow direction of the exhaust gas, and
the upstream-side catalyst layer includes Pt and Pd at a mass concentration ratio of 2.5:1 to 1.5:1 and 0.94 to 1.18 g/L of the amount of platinum.

2. The oxidation catalyst for the diesel engine according to claim 1, wherein a through hole having a hexagonal section concerning the flow direction of the exhaust gas is formed in the substrate.

3. The oxidation catalyst for the diesel engine according to claim 1, wherein the substrate is a partial type soot filter.

4. The oxidation catalyst for the diesel engine according to claim 1, wherein the downstream-side inner catalyst layer includes a first side in contact with the substrate and a second side in contact with the downstream-side outer catalyst layer.

5. An oxidation catalyst for a diesel engine, the oxidation catalyst comprising:
a substrate; and
three catalyst layers coupled to the substrate, the three catalyst layers including:
an upstream-side catalyst layer coupled to the substrate and comprising Pt and Pd, the upstream-side catalyst layer includes Pt and Pd at a mass concentration ratio of 2.5:1 to 1.5:1 and 0.94 to 1.18 g/L of the amount of platinum;
a first downstream-side catalyst layer coupled to the substrate and comprising Pt and Pd, the first downstream-side catalyst layer includes an amount of platinum in g/L that is different from the amount of platinum of the upstream-side catalyst layer; and
a second downstream-side catalyst layer coupled to the substrate and comprising Pt, the first down-stream catalyst layer positioned intermediate the second downstream-side catalyst layer and the substrate;
wherein:
the upstream-side catalyst layer is positioned upstream of the first downstream-side catalyst layer and the second downstream-side catalyst layer in relation to a flow direction of exhaust gas, and
a ratio of a length of the upstream-side catalyst layer and a length of the second downstream-side catalyst layer is within a range from 1:9 to 1:1 in the flow direction of the exhaust gas.

6. The oxidation catalyst according to claim 5, wherein the second downstream-side catalyst layer is free of Pd.

7. The oxidation catalyst according to claim 5, wherein the second downstream-side catalyst layer is in contact with the first downstream-side catalyst layer.

8. The oxidation catalyst according to claim 7, wherein the upstream-side catalyst layer is in contact with each of the first downstream-side catalyst layer and the second downstream-side catalyst layer.

9. The oxidation catalyst according to claim 7, wherein:
the amount of Pt and Pd in the upstream-side catalyst layer is independent of a characteristic of the engine,
the amount of Pt and Pd in the first downstream-side catalyst layer is independent of the characteristic of the engine, and the amount of Pt in the second downstream-side catalyst layer is based on the characteristic of the engine.

10. The oxidation catalyst according to claim 9, wherein the characteristic of the engine comprises characteristics of exhaust gas from the engine.

11. The oxidation catalyst according to claim 9, wherein the characteristic of the engine comprises an oxidation efficiency value of exhaust gas from the engine.

12. The oxidation catalyst according to claim 5, wherein the ratio of the length of the upstream-side catalyst layer and the length of the second downstream-side catalyst layer is 3:10 in the flow direction of the exhaust gas.

13. The oxidation catalyst according to claim 12, wherein the first downstream-side catalyst layer includes Pt and Pd at the mass concentration ratio of 1:1.

14. The oxidation catalyst according to claim 13, wherein the second downstream-side catalyst layer is free of Pd.

15. The oxidation catalyst according to claim 5, wherein the ratio of the length of the upstream-side catalyst layer and the length of the second downstream-side catalyst layer is 1:4 in the flow direction of the exhaust gas.

16. The oxidation catalyst according to claim 15, wherein the first downstream-side catalyst layer includes Pt and Pd at the mass concentration ratio of 1:1.

17. The oxidation catalyst according to claim 16, wherein the second downstream-side catalyst layer is free of Pd.

\* \* \* \* \*